(12) United States Patent
Hanus et al.

(10) Patent No.: US 7,773,812 B2
(45) Date of Patent: Aug. 10, 2010

(54) METHOD AND SYSTEM FOR PERFORMING SEARCHES AND RETURNING RESULTS BASED ON WEIGHTED CRITERIA

(75) Inventors: Peter Hanus, Bellevue, WA (US); Paul Hagger, Redmond, WA (US); Zach Proffitt, Duvall, WA (US); Gordon Barnes, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 11/102,969

(22) Filed: Apr. 11, 2005

(65) Prior Publication Data

US 2006/0241901 A1 Oct. 26, 2006

(51) Int. Cl.
*G06K 9/68* (2006.01)
*G06K 9/62* (2006.01)
*G06K 9/00* (2006.01)

(52) U.S. Cl. ............... 382/220; 382/209; 382/181; 382/218

(58) Field of Classification Search .......... 705/22, 705/28
See application file for complete search history.

(56) References Cited

U.S. PATENT DOCUMENTS

| 6,070,158 | A * | 5/2000 | Kirsch et al. ............ 707/3 |
| 6,397,212 | B1 * | 5/2002 | Biffar ..................... 707/5 |
| 7,328,177 | B1 * | 2/2008 | Lin-Hendel ............ 705/27 |

* cited by examiner

*Primary Examiner*—F. Ryan Zeender
*Assistant Examiner*—Fahd A Obeid
(74) *Attorney, Agent, or Firm*—Shook, Hardy & Bacon, LLP.

(57) ABSTRACT

A method and system are provided for comparing a focal product with several comparison products. First, selecting a focal product and several attributes relating to the focal product and the comparison products, standardizing and weighting the attributes, and determining for each weighted attribute an attribute score. Next, based on the attribute score, calculating a total score for each comparison product, and based on the total score, presenting to a user or purchaser the comparison products most relevant to the user's criteria.

12 Claims, 11 Drawing Sheets

FIG. 3D.

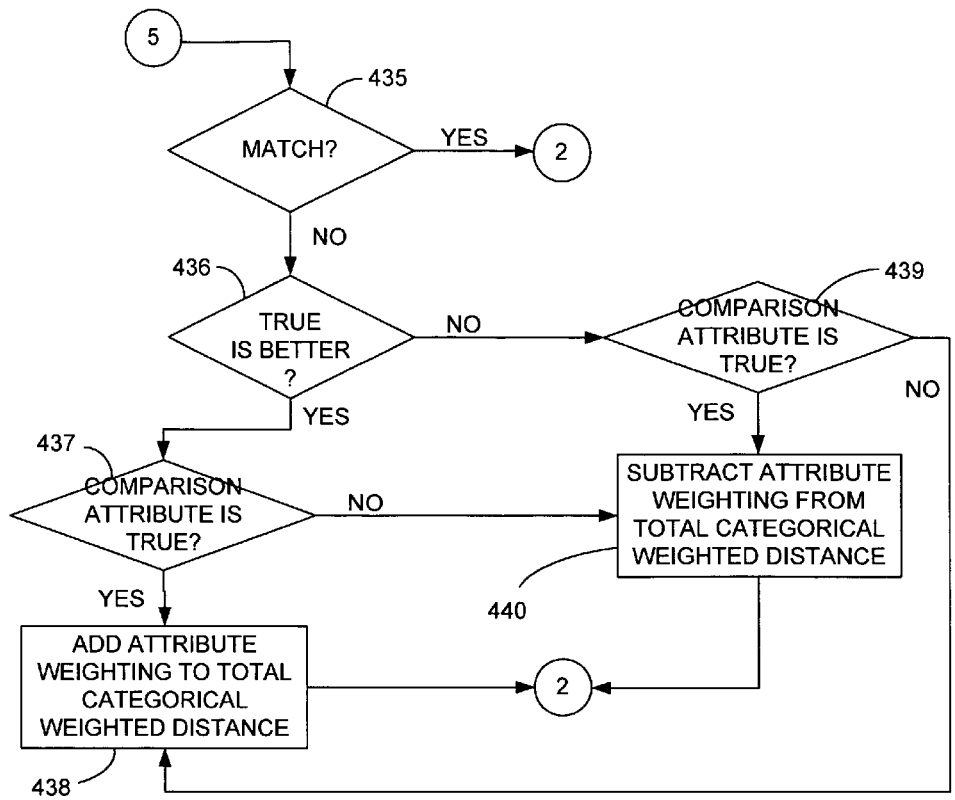
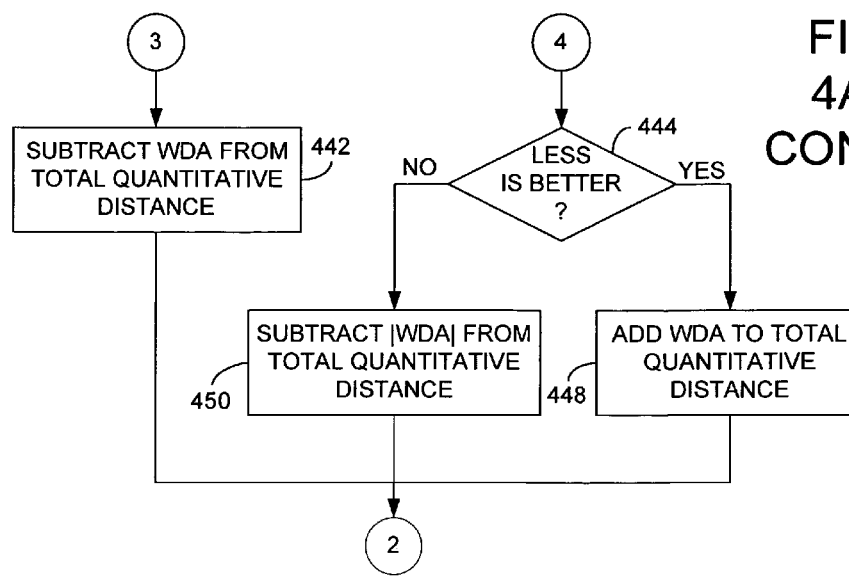
FIG. 4A., CONT'D

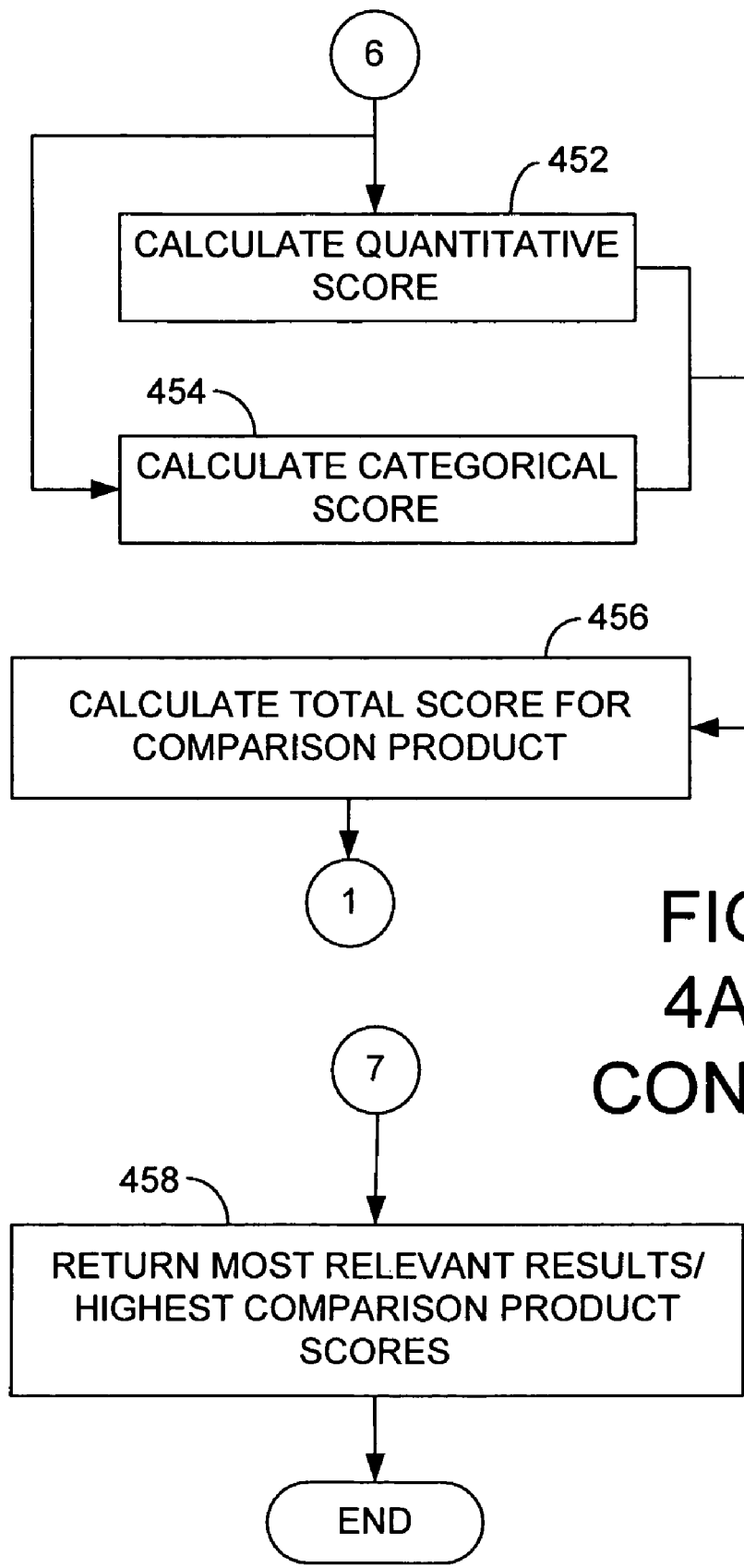
FIG. 4A., CONT'D

FIG. 4B.

METHOD AND SYSTEM FOR PERFORMING SEARCHES AND RETURNING RESULTS BASED ON WEIGHTED CRITERIA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to a decision assistance engine using clustered and weighted search criteria. More particularly, but not by way of limitation, embodiments of the present invention relate to providing a user researching a particular product with a set of similar or better products based upon either user or editorial (default) attribute weightings.

BACKGROUND OF THE DISCLOSURE

Usage of the Internet or World-Wide-Web (WWW) is becoming increasingly popular for product purchases (E-commerce) and products researching. Typically, users of the Internet, prior to purchasing a product either online or through a traditional vendor, will research the product using various search tools such as Microsoft™ Network (MSN™). Internet users may utilize search tools for a variety of reasons. For example, to research the attributes of a particular product, locations of where to purchase the particular product, or alternative products that have the same attributes as the focal product.

In one example, a user purchasing a car may first research the car on the Internet. A user may either have a particular car in mind and simply wish to determine the best price or the best location of where to purchase the car. However, the user may have a particular car in mind, but wish to view alternative cars having similar attributes as the focal car or having better attributes than the focal car. Researching products, such as a car, having many decision points or criteria associated therewith, may be a difficult and time-consuming process. In the example of a car, various criteria include, but are not limited to, discrete criteria such as seating capacity, number of doors, average miles per gallon (MPG), manufacturer's specified retail price (MSRP), and curb weight. Further complicating the research and decision process are various criteria that are general in nature such as performance, economy, comfort, and safety.

Current technology in the art lacks the tools to quickly and efficiently enable a purchaser of a product to determine what product best fits the wants and needs of the purchaser. It would be desirable to have a tool that will help the user determine which criteria are of most importance to them as well as determine the relative importance of each criteria within that set.

BRIEF SUMMARY OF THE DISCLOSURE

Embodiments of the present invention provide a novel method and system for assisting in product research and selection through clustering and weighting search parameters. Moreover, embodiments of the present invention have several practical applications in the technical arts, including, but not limited to, efficiently researching products that best fit the wants and needs of a purchaser. This may be accomplished by weighting attributes associated with a focal product and a set of comparison products and performing calculations that produce clustering of products to allow for comparisons between the focal and comparison products. The attributes may be also be assigned directions and weighted in a manner such that they are substantially similar to, better than, or less than a purchaser's criteria in relation to the focal product.

In one embodiment, a method is provided for comparing a focal product with several comparison products. The method comprises selecting a focal product and several attributes relating to the focal product and the comparison products, standardizing and weighting the attributes, and determining for each weighted attribute an attribute score. Based on the attribute score, calculating a total score for each comparison product, and based on the total score, presenting to a user or purchaser the comparison products most relevant to the user's criteria.

In another embodiment, a computer system is provided having a graphical user-interface including a display and a user-interface selection for determining if several comparison products are substantially similar to a focal product. The method comprises selecting a focal product and attributes relating to the focal product and the comparison products, where each attribute is either categorical in nature or quantitative in nature. Next, standardizing and weighting the attributes, calculating a categorical likelihood score and a quantitative likelihood score for each comparison product based upon the weighted attributes, and determining a total likelihood score based upon the categorical and quantitative likelihood scores. Finally; based on the total likelihood score, presenting to a user or purchaser, in order of similarity to the focal product, the comparison products.

In yet another embodiment, computer-readable media having computer-useable instructions embodied thereon is provided for performing a method of determining, relative to a focal product, comparison products that are better or worse than the focal product based on the purchaser having assigned directions to the attributes, which may be more than, less than, or the same as the focal product's attributes. First, the method comprises standardizing the attributes, and assigning a weight to each of the attributes, where each of the attributes are of a type categorical in nature or quantitative in nature. Next, determining a direction for each of the weighted attributes. For each of the comparison products, the method performs the following:

(a) based on directions, weights and attribute types, calculating a categorical score and a quantitative score for each comparison product; and (b) determining a total score based upon the categorical and quantitative scores;

Finally, based on the total scores (each calculated individually for each comparison product), and the assigned weights and directions used to calculate the said score, presenting to a user or purchaser, in order of relevancy to the focal product, the most relevant comparison products (or the comparison products with the highest scores).

Additional features are described in greater detail below.

BRIEF DESCRIPTION OF THE SEVERAL VIEWS OF THE DRAWING

Embodiments of the present invention are described in detail below with reference to the attached drawing figures, which are incorporated in their entirety by reference herein and wherein:

FIG. 3D is another embodiment of exemplary results returned by the method of FIG. 3A to a user according to the present invention;

FIG. 4B is one embodiment of exemplary results returned by the method of FIG. 4A to a user according to the present invention.

DETAILED DESCRIPTION OF THE DISCLOSURE

Figure 1A:
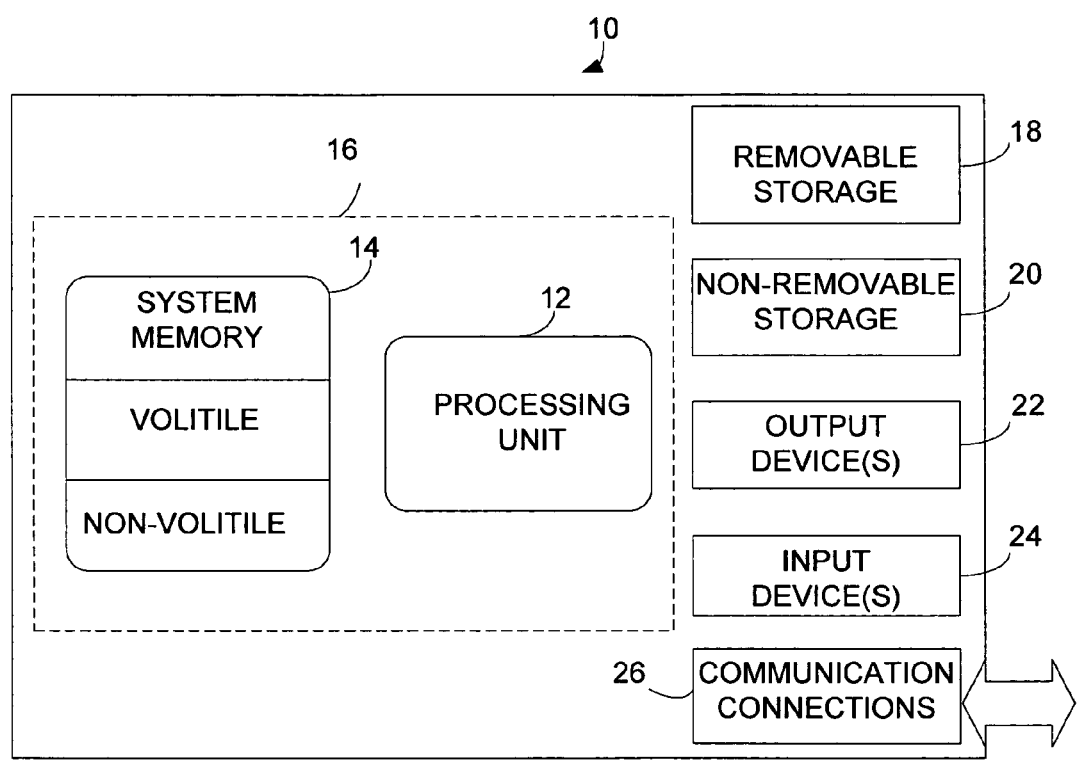
FIG. 1A is an exemplary embodiment of a computing system environment according to the present invention.

Embodiments of the present invention provide a novel method and system for assisting in product research and selection through weighting of, and applying directions to, search parameters. In some embodiments, the novel method and system includes standardizing attributes relating to a set of products, weighting the attributes according to a default or a user's response to the importance of each instance of the attributes to the user. Based on the weights assigned to the attributes, creating a clustered product set from a set of comparison products and presenting to the user those products that are the closest match to the user's criteria.

Further, some embodiments of the present invention may comprise comparing a focal product provided by the user to comparison products and returning a score to the user representing a substantial similarity of the focal product to the comparison product. Further still, embodiments of the present invention may comprise comparing the focal product with comparison products, and returning a score representing whether or not the alternative product is better than, same as or worse than the focal product.

The various embodiments of the present invention will be better understood from the detailed description provided below and from the accompanying drawings of various embodiments of the invention. The detailed description and drawings, however, should not be read to limit the invention to the specified embodiments. Rather, these specifics are provided for explanatory purposes to help the invention be better understood.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring embodiments of the present invention. But an ordinary-skilled artisan would understand that embodiments of the present invention may be practiced without these specific details. Computer systems, servers, workstations, and other machines may be connected to one another across the communications medium including, for example, a network or network of networks. Further, illustrative data structures used to explain various embodiments of the present invention may be, but are not limited to, databases, spreadsheets, and any other apparatus capable of being a storage medium. Further still, illustrative processors used to explain the various embodiments of the present invention may be, but are not limited to, workstations, personal computers, mainframe computers, or any other suitable processing device. Also, a network may be, but is not limited to, either an Internet network, Intranet network, local area network (LAN), metropolitan area network (MAN), wide area network (WAN), or a combination thereof without limiting the scope of the various embodiments of the present invention.

Turning to FIG. 1A, there is illustrated an exemplary embodiment of a computing system environment 10. The computing system environment 10 is only one example of a suitable computing environment and is not intended to suggest any limitation as to the scope of or use or functionality of the invention. Neither should the computing environment 10 be interpreted as having any dependency or requirement relating to any one or combination of components illustrated in the exemplary operating environment 10.

The invention is operational with numerous other general purpose or special purpose computing system environments or configurations. Examples of well-known computing system environments and/or configurations that may be suitable for use with the invention include, but are not limited to, personal computers, server computers, handheld or laptop devices, multi-processor systems, microprocessor-base systems, set-top boxes, programmable consumer electronics, network PCs, mini-computers, mainframe computers, distributed computing environments that include any of the above systems or devices and the like.

The invention may be described in the general context of computer-executable instructions, such as program modules, being executed by a computer. Generally, program modules include, but are not limited to, routines, programs, objects, components, and data stores that perform particular tasks or implement particular abstract data types. The invention may also be practiced in distributed computing environments where tasks are performed by remote processing devices that are linked through a communications network. In a distributed computing environment, program modules may be located in both local and remote computer storage media, including memory storage devices.

Turning again to FIG. 1A, an exemplary system includes a computing system, such as computing device 10. In its most basic configuration, computing device 10 typically includes at least one processing unit 12 and a memory 14. Depending on the exact configuration and type of computing device, memory 14 may be volatile (such as RAM), non-volatile (such as ROM), flash memory, etc . . . ) or some combination thereof. This most basic configuration is illustrated in FIG. 1 by dash line 16. Additionally, device 10 may also have additional features and/or functionality. For example, device 10 may also include additional storage (removable and/or non-removable) including, but not limited to, magnetic or optical disks or tape. Such additional storage is illustrated in FIG. 1 by removable storage 18 and non-removable storage 20. Computer storage medium includes volatile and non-volatile, removable and non-removable media implemented in any method or technology for storage of information such as computer-readable instructions, data stores, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 10. Device 10 may also comprise communications connections 26 that allow the device to communicate with other devices.

Communications connections 26 are exemplary of communication media. Communication media typically embodies computer-readable instructions, data stores, program modules, or any other data in a modulated signal data such as a carrier wave or other transport mechanism and includes any information delivering media. The term "modulated-data signal" means a signal that has one or more of its characteristics set or changed in such a manner so as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

Device 10 may also have input device(s) 24 such as keyboard, mouse, pen, voice input device, touch input device, etc . . . . Output device(s) 22 such as, but not limited to, display, speakers, and printers may also be included. All these devices are well known in the art and need not be discussed at length here.

For ease of understanding, and not by way of limitation, embodiments of the present invention will be explained in the context of a vehicle purchase. Further, exemplary methods described in further detail in relation to FIGS. 1B-4B utilize attributes pertaining to cars, which have a particular taxonomy. The taxonomy is year, make, model, and trim. For example, but not by way of limitation, a 2005 Honda Accord EX V6 has a year of 2005, a make of Honda, a model of Accord, and a trim of EX V6. Generally, there are a number of trims for each model. In a normal model year, there are approximately 300 models and approximately 1,700 trims. Attributes associated with each trim are used to determine the relevant results to return to the user, but, however, it is not uncommon for a particular trim to be missing attributes. In one instance, fuel economy data may be missing for about 20% of the trims. These may be termed data holes. One embodiment of the present invention for filling these data holes is as follows: use an average of the other trims for the specific model year, use an average for the vehicle family for the latest model year data that is available, or use an average for the category for the model year to which the trim belongs.

Since a particular model may comprise a number of trim sets, various embodiment of the present invention may utilize a "wide-vector" analysis to expeditiously process a purchaser's search of comparison cars (or products). Wide-vector analysis comprises consolidating high and low values for each attribute for each trim set associated with a model. By way of example, but not by way of limitation, if a particular model includes 3 trims having MPG ratings of 19 City 25 Hwy, 19 City 27 Hwy, and 17 City 22 Hwy, then the wide-vector may be min 17 max 27 MPG. If a purchaser's criteria indicates a preference for a vehicle having a 30 MPG rating, the particular model would not be utilized in returning relevant results to the purchaser.

Figure 1B:
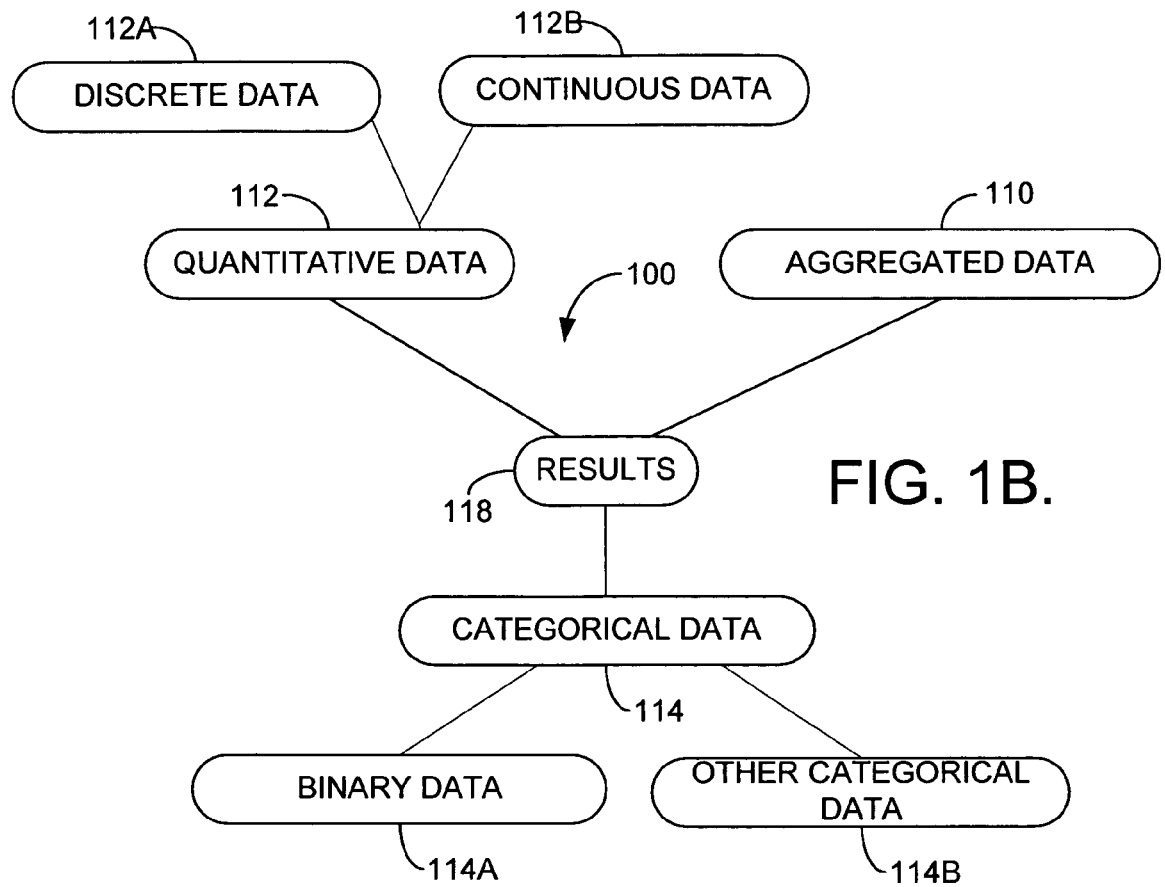
FIG. 1B is an exemplary embodiment of attributes used in determining the relevancy of a comparison product to a focal product according to the present invention.

Referring now to FIG. 1B, there is illustrated exemplary attributes used in determining the relevancy of a comparison product to a focal product. As mentioned above, throughout this disclosure, for ease of understanding, the various attributes and algorithms associated with the embodiments of the present invention are described in relation to purchasing a car. Attributes 100 of FIG. 1B may comprise, but are not limited to, quantitative attributes 112 which includes discrete attributes 112A, and continuous attributes 112B. Attributes 100 further include, but are not limited to, aggregated attributes 110, and categorical attributes 114. Categorical attributes 114 further include binary attributes 114A, and other categorical attributes 114B. Discrete attributes 112A comprise attributes such as seating capacity and number of doors on a car. Continuous attributes 112B comprise attributes such as MPG, MSRP, and curb weight. Further, binary attributes 114A may be expressed as "True" or "False". Other categorical attributes 114B may include bit-masked attributes (attributes belonging to one or more categories), and attributes belonging to a single category. Aggregate attributes 110 are general in nature, such as, but not limited to, performance, fuel economy, comfort, and safety. Aggregate attributes 110 comprise an amalgamation of one or more attributes that are either categorical or quantitative in nature. The aforementioned attributes are used to present results 118 to a user Tuning now to FIG. 1C, there is illustrated an embodiment of a method of comparing a focal vehicle to a comparison vehicle. A method 102 comprises a preparation step 120. Step 120 prepares, for purposes of comparison, attributes related to various trim models of comparison products or vehicles. Step 120 will be further described in relation to FIG. 2. A step 122 comprises methods related to calculation of comparison values using attributes prepared in step 120. Step 122 will be discussed in further detail in relation to FIGS. 3A and 4A. Finally, at a step 124, comparison results are rendered based on calculations performed at steps 120 and 122. Results will be illustrated in relation to FIGS. 3B-3D, and 4B.

Figure 1C:
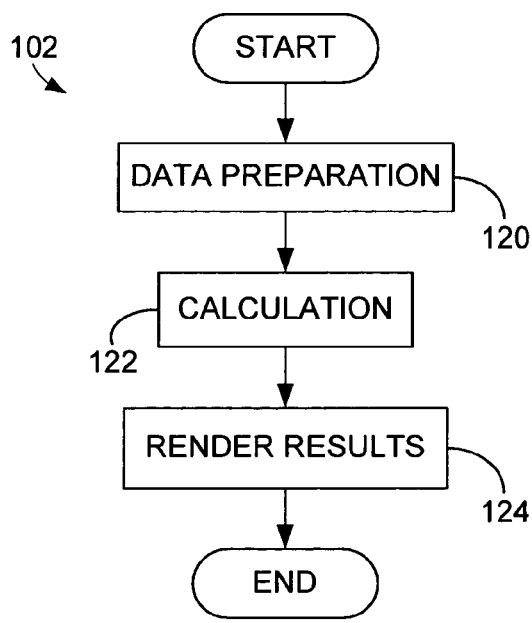
FIG. 1C is an embodiment of a method of comparing a focal vehicle to a comparison vehicle according to the present invention.
Figure 2:
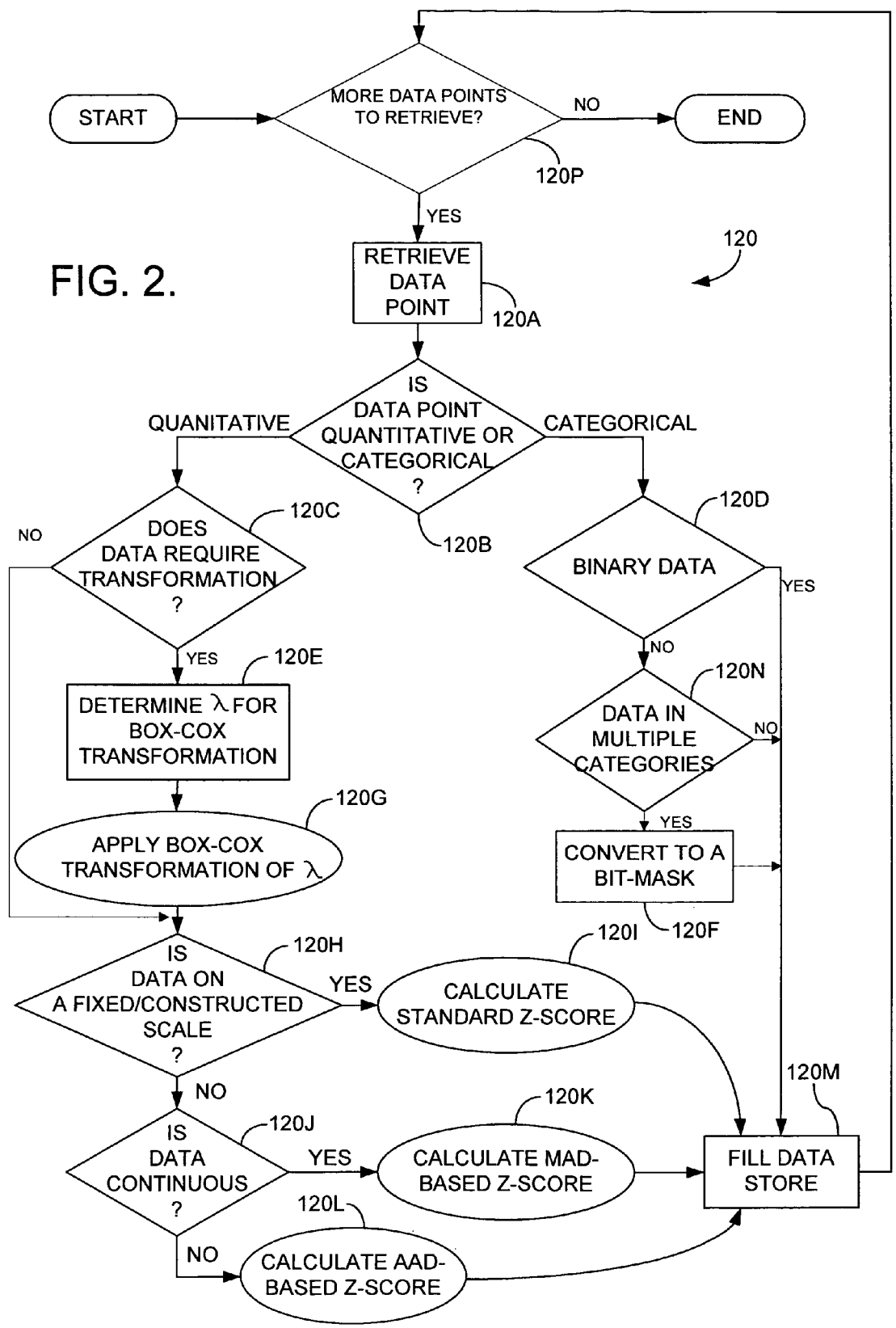
FIG. 2 is one embodiment for standardizing attributes according to the present invention.

Turning now to FIG. 2, there is illustrated one embodiment of method 120 of FIG. 1C. At a step 120A, trim set attributes relating to a variety of vehicles—which in later analysis may be used either as focal or comparison vehicles—are retrieved from a data store or data stores. At a step 120B, a determination is made as to whether a particular attribute of a trim set is categorical or quantitative in nature. Quantitative attributes may be, but is not limited to, discrete or continuous attributes. Categorical attributes, include, but is not limited to, binary attributes, and other categorical attributes. Continuing with step 120B, if a particular attribute of a trim set is quantitative in nature, a decision is made at a step 120C as to whether the attribute requires transformation. In order to standardize or normalize the various trim set attributes in preparation method 120, an assumption is made that the attributes being standardized approximates a normal distribution (e.g., assumes the shape of a bell curve). Embodiments of the present invention assume attributes in a trim set are in a normal distribution, a positively skewed distribution, or a negatively skewed distribution. In a normal distribution, a one unit difference has the same significance at any part of the distribution, in a positively skewed distribution, a one unit difference gains in significance the further to the lower end of the distribution, and in a negatively skewed distribution, a difference of one unit gains in significance the further to the higher end of the distribution. Continuing with step 120C, if the attributes comprising a particular trim set are not in a normal distribution, then a Box-Cox transformation is utilized to approximate the attributes in the particular trim set as a normal distribution. In other words, the Box-Cox transformation normalizes the data. The Box-Cox transformation is shown below in equation (1), with exemplary values of lambda given in Table 1.

$$T(x_i) = \frac{x_i - 1}{\lambda} \quad (1)$$

TABLE 1

| λ (lambda) | Transformation |
| --- | --- |
| 1.0 | No transformation |
| 0.5 | Square root transformation |
| 0 | Log transformation |
| −1 | Reciprocal Transformation |

In equation (1), $x_i$ is the data point and $\lambda$ is the transformation parameter. A log-likelihood equation is used to determine the value of $\lambda$ that provides values of the transformation of equation (1) which will normalize the particular attributes in the trim set. The optimal $\lambda$ value is determined at a step 120E as shown in Table 1. At a step 120G, the Box-Cox transformation is applied using the value of $\lambda$ determined at step 120E.

If no transformation is required at step 120C, or a transformation is applied at 120G, the attributes are standardized at steps 120I, 120K, and 120L. Standardization may be useful for understanding the extent to which the difference in each attribute contributes to an overall comparison score between the focal vehicle and a comparison vehicle. A Z-score is utilized to standardize attributes relating to a trim set. At a step 120H, if the data is on a fixed/constructed scale, then a standard Z-score is calculated for the data at step 120I. A standard Z-score is utilized because fixed/constructed data (e.g., reliability rating) generally does not comprise "outliers" Outliers are data points that skew the values of the mean and standard deviation. A standard Z-score is illustrated below in Equation (2).

$$z_{xi} = \frac{x_i - \bar{x}}{s} \quad (2)$$

Where $x_i$ is the data point being standardized, $\bar{x}$ is the arithmetic mean, and s is the standard deviation.

At a step 120J, if the attribute is continuous (e.g., curb weight), a median absolute deviation about the median (MAD) is utilized to account for the effect of outliers. The MAD-based Z-score is illustrated below in equation 3. Where $\tilde{x}$ is the median.

$$z''_{xi} = \frac{x_i - \tilde{x}}{MAD}, \quad \text{where} \quad MAD = \text{median}(|x_i - \tilde{x}|) \times 1.4826 \quad (3)$$

If at step 120J the data is not continuous, but is discreet data (e.g., seating capacity) the standard deviation, s, of equation (2) is replaced with the average absolute deviation about the mean (AAD) as shown below in equation (4).

$$z'_{xi} = \frac{x_i - \bar{x}}{AAD}, \quad \text{where} \quad AAD = \frac{\sum_{i=1}^{n} |x_i - \bar{x}|}{n} \quad (4)$$

After standardizing the data points at steps 120I, 120K, and 120L, a data store is created at a step 120M that comprises the standardized or normalized attributes for each particular trim set. Referring back to step 120B of method 120, if the data points of a particular set of trim data are categorical in nature, then method 120 continues at a step 120D. At step 120D, if the particular data is not binary, and belongs to multiple categories, then each attribute is converted to a bitmask having a category ID represented by a bit in the bitmask. The converted categorical attributes, along with binary, and exclusive categorical data is stored in the created data store at step 120M. Thus, method 120 results in the creation of a data store 120M having standardized or normalized trim set attributes. The vehicle attributes may then be used to compare a focal vehicle to a comparison vehicle. At a step 120 P, if no data points are to be retrieved, method 120 ends.

Figure 3A:
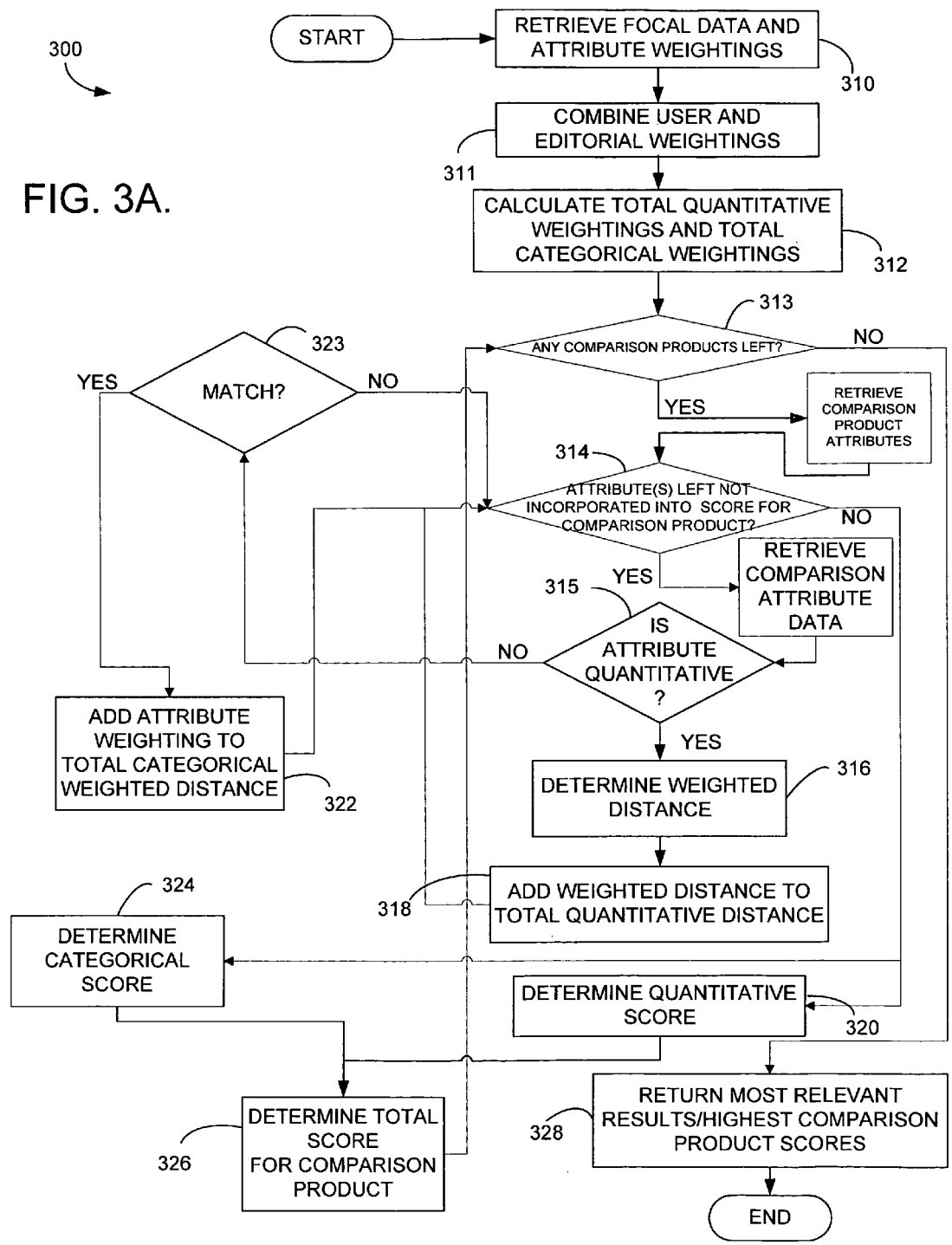
FIG. 3A is one embodiment of a method for returning results in a search for comparison vehicles having attributes that are substantially similar to a focal vehicle according to the present invention.
Figure 3B:
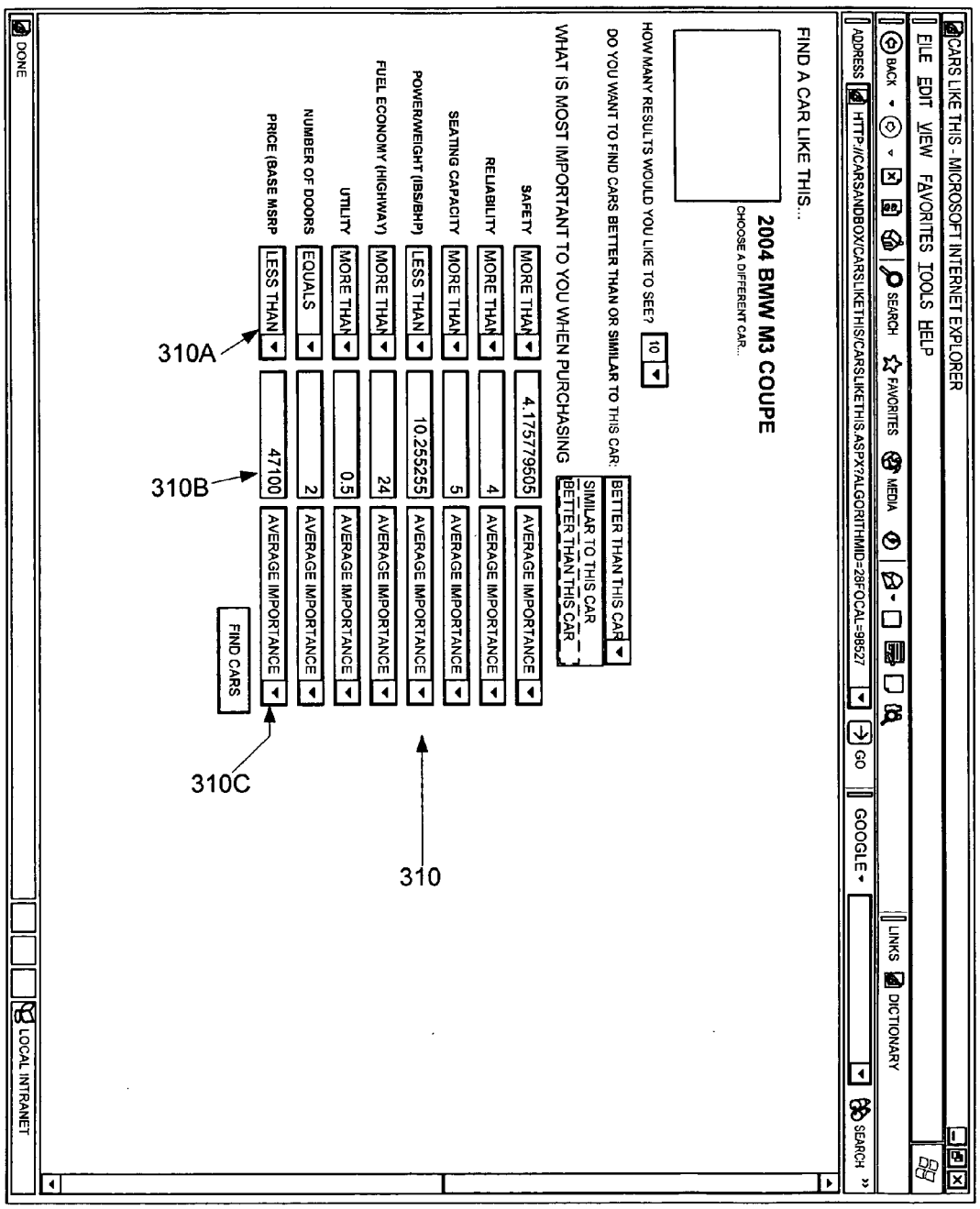
FIG. 3B is one embodiment of an exemplary user-interface for assigning user weightings to various attributes according to the present invention.

Referring now to FIG. 3A, there is illustrated one embodiment of a method 300 for returning relevant results in a search for comparison vehicles that are substantially similar to a focal vehicle when compared on an attribute-by-attribute basis. Method 300 compares the focal vehicle to a set of comparison vehicle attributes and returns a score representing how substantially similar a particular comparison vehicle in the set of comparison vehicles is to the focal vehicle. The vehicles are compared on an attribute-by-attribute basis. Scores may, but are not limited to the range of 0 to 1, with 1 representing an exact match and 0 representing the greatest possible mismatch. At a step 310, the focal car attributes are retrieved and attribute weighting are retrieved. With reference to FIG. 3B, attribute weightings may be given by the user, or may be default weightings. Attribute weightings given by the user may be illustrated in FIG. 3B using several attributes ranging from safety to base MSRP price in a field set 310. The user selects, at a field 310A and 310B, that a safety rating higher than the safety rating of the focal vehicle (displayed as 4.175. . . ) should be considered better. At a field 310C, the user inputs this as average importance meaning "safety rating" is of average importance relative to the other attributes in determining the most relevant comparison vehicles. Similarly, the user selects the base price should be less than $47, 100, and inputs this as average importance.

Continuing with method 300 of FIG. 3A, at a step 311, user and editorial weightings are combined. At a step 312, total quantitative and categorical weightings are calculated. At a step 313, comparison vehicle attributes are retrieved in an iterative/per vehicle basis. At a step 314, each individual attribute of the current comparison vehicle is iteratively retrieved for contrasting with the same attribute of the focal vehicle. At a step 315, a determination is made as to whether an attribute in a trim set is quantitative. If the attribute is quantitative, at a step 316, a weighted distance is calculated. Weighted distances may be calculated using either one of the two metrics given below in equations (5) and (6).

$$d_{xy} = \sum_{i=1}^{n} w_i |x_i - y_i| \quad (5)$$

$$d_{xy} = \sqrt{\sum_{i=1}^{n} (w_i(x_i - y_i))^2} \quad (6)$$

In equations (5) and (6), $w_i$ is the weight assigned to the $i^{th}$ attribute, $x_i$ is the value of the $i^{th}$ attribute of the focal vehicle, and $y_i$ is the value of the $i^{th}$ attribute of the comparison vehicle. $W_i$ may represent any combination of weights assigned by the user or editorially assigned. Equation (5) treats the distance between two vehicles as if moving along each dimension in a N-dimensional universe to move from one vehicle to the next. Equation (6) treats the distance between two vehicles as if it were a straight line. At a step 318, the weighted distances computed at step 316 are added to the total quantitative weighted distances.

At a step 323, a determination is made as to whether there is a match between the focal vehicle and the associated attribute of the comparison vehicle. If yes, at a step 322, the attribute weighting is added to the total categorical weighted distance. After completing the iterations of a step 314, at a step 324 and 320, the quantitative and categorical scores are determined by, respectively, equations (7) and (8) below.

$$sim_{xy} = 1 - \frac{d_{xy}}{\max|d|} \quad (7)$$

$$sim_{xy} = \frac{\sum_{i=1}^{n} w_i sum_i}{\sum_{i=1}^{n} w_i} \quad (8)$$

In equation (7), $\max|d|$ is computed by calculating the distance between two concept vehicles: one having the largest values for each quantitative attribute in the trim set, and the other having the smallest values for each quantitative attribute in the trim set. The same weighting used in calculating $d_{xy}$ should be utilized when calculating $\max|d|$. This produces a similarity score in the range of 0 to 1. In equation (8), $sum_i$ equals 1 if there is a match on the $i^{th}$ attribute or 0 if there is not a match. $W_i$ is the editorial or user weightings. At a step 326, a score for both quantitative and categorical attributes for a given comparison vehicle is determined using equation (9) below.

$$sim_{xy} = \frac{\left(sim_{c(xy)} \times \sum_{i=1}^{n_c} w_{ci}\right) + \left(sim_{q(xy)} \times \sum_{j=1}^{n_q} w_{qj}\right)}{\sum_{i=1}^{n_c} w_{ci} + \sum_{j=1}^{n_q} w_{qj}} \quad (9)$$

Figure 3C:
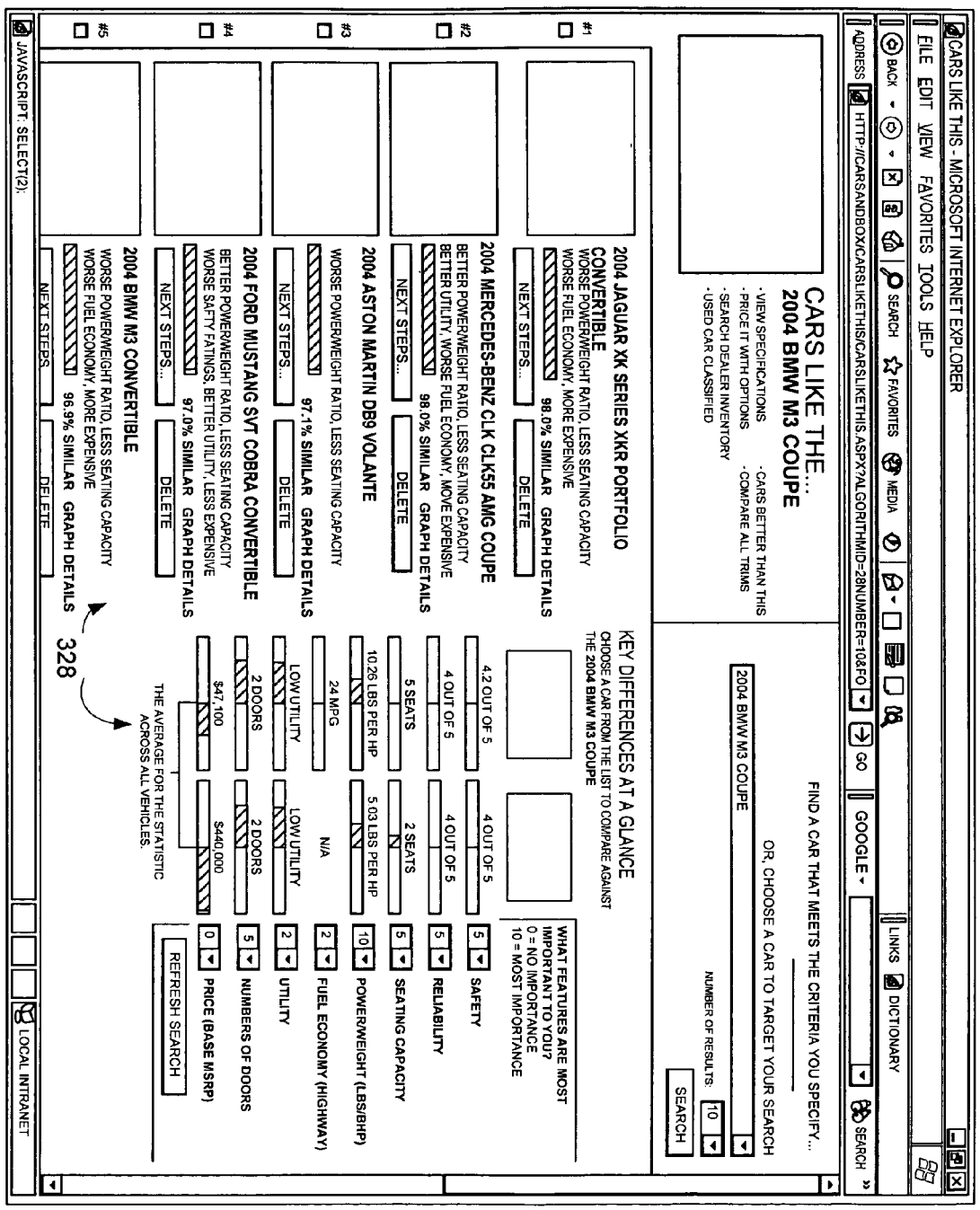
FIG. 3C is one embodiment of exemplary results returned by the method of FIG. 3A to a user according to the present invention.
Figure 3D:
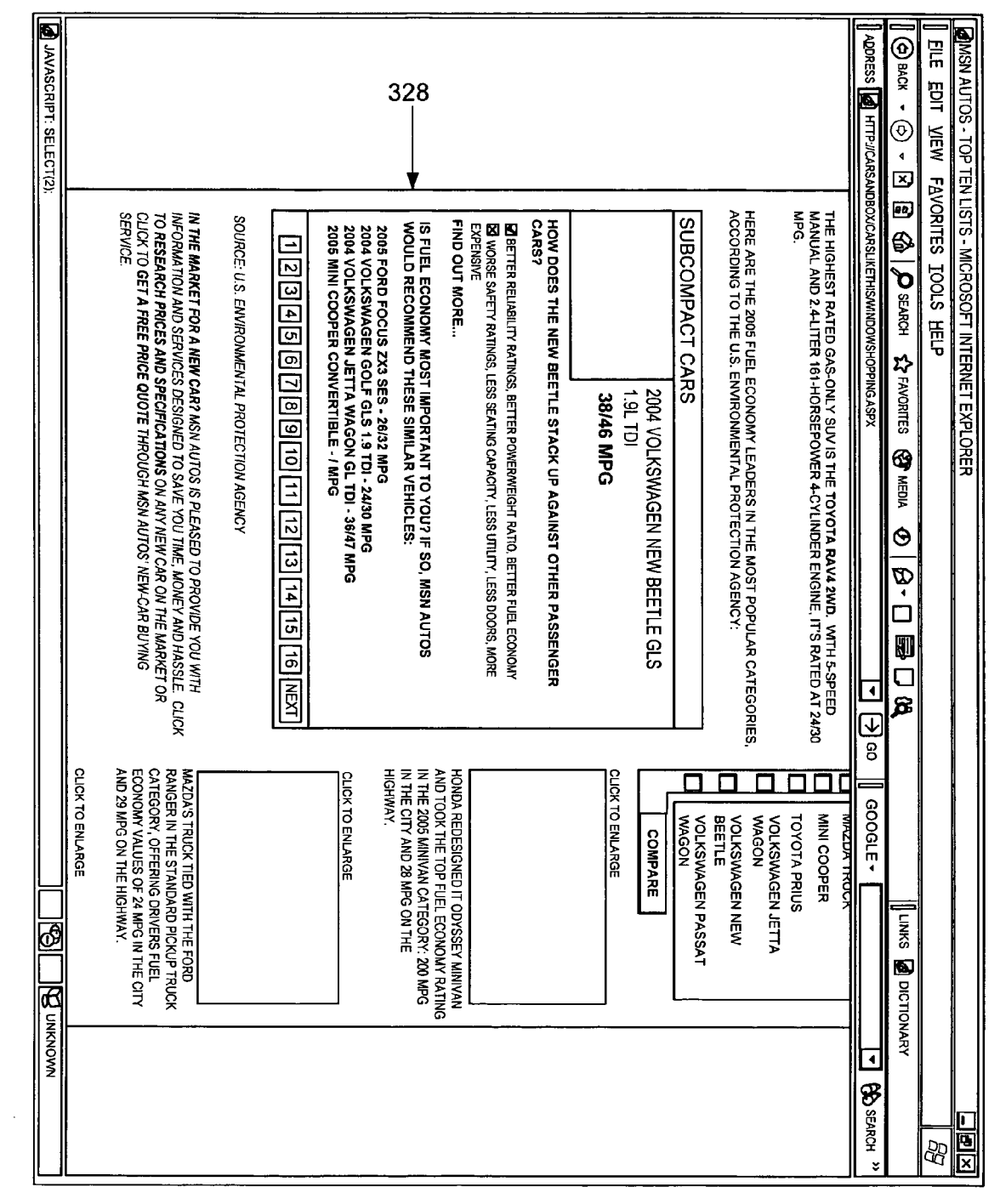

In equation (9), $n_c$ is the total number of categorical attributes, and $n_q$ is the number of quantitative attributes. After completing the iterations for step 313, at a step 328, the most relevant results in the set of comparison vehicles are returned to the user. Referring now to FIGS. 3C and 3D, there is illustrated results 328 returned to the user. In one embodiment (FIG. 3C), the results 328 are illustrated using a percent match and descriptive indicators. In another embodiment illustrated in FIG. 3D, the most relevant results 328 are returned, and, in addition, an article about fuel economy is displayed.

Figure 4A:
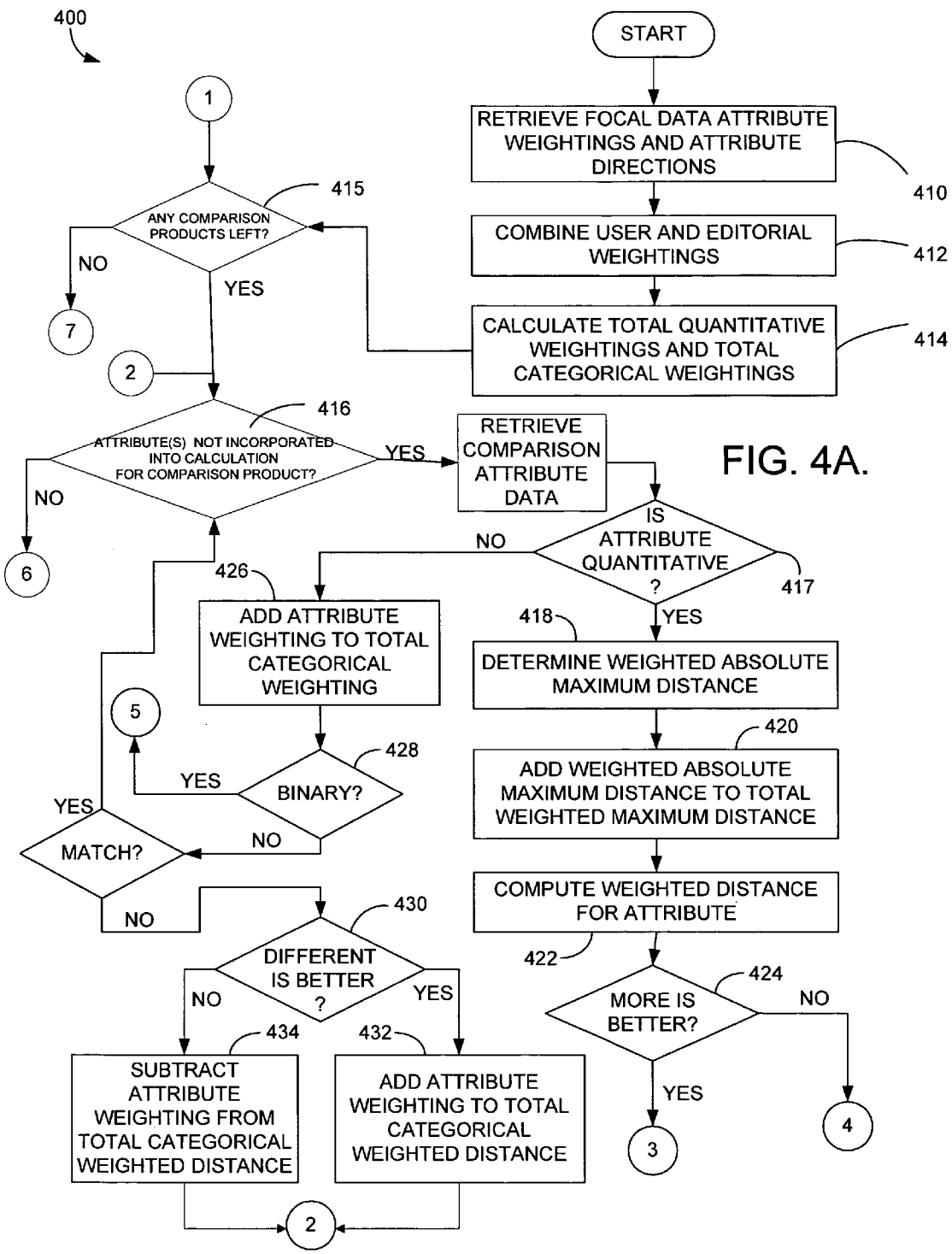
FIG. 4A is one embodiment of a method for returning the most relevant results in a search for comparison vehicles when contrasting attributes—that are given directions of more than, less than, different than, the same as, valued true, or valued false—to a selected focal vehicle's attributes according to the present invention.

Turning now to FIG. 4A, there is illustrated one embodiment of a method 400 for returning the most relevant results in a search for comparison vehicle attributes that are more than, less than, or the same as a selected focal vehicle's attributes. Method 400, like method 300, compares a focal vehicle's attributes to a set of comparison vehicle attributes and returns a score. Method 400 further comprises a specified direction. The score may fall in the range of (−1) to 1, where a positive score indicates a comparison vehicle is better than the focal vehicle based on an overall comparison on an attribute-by-attribute basis, and a negative score indicates the comparison vehicle is worse than the focal vehicle on an attribute-by-attribute basis. Returning to FIG. 4A, at a step 410, focal vehicle attributes, and attribute weightings and directions are retrieved from the data store created at step 120M described in FIG. 2. At a step 412 user and editorial weightings are combined. Editorial weightings are preset weightings for an attribute in a trim set, set independently from the user. Default directions define the initial direction of the attribute on an attribute-by-attribute basis. For example, most users would input less is better for MSRP, thus, the direction of less is better is the default direction. The possible directions may be, but are not limited to, more is better, less is better, and same is better. At a step 414, total quantitative weightings and total categorical weightings are calculated. At a step 415, comparison vehicle attributes are retrieved in an iterative/per vehicle basis. At a step 416, each individual attribute of the current comparison vehicle is iteratively retrieved for contrasting with the same attribute of the focal vehicle. At a step 417, if an attribute is determined to be quantitative, then method 400 continues at a step 418 where a weighted absolute maximum distance on an attribute is calculated. At a step 420, the weighted absolute maximum distance for an attribute is added to a total weighted maximum distance for all attributes. At a step 422, the weighted distance for an attribute is calculated. If, at a step 424, the direction is more is better, method 400 continues with a step 442, where the total quantitative weighted distance is summed with (−1) multiplied by the weighted distance for the attribute. At a step 444, if the direction is less is better, then method 400 continues at a step 448 where the value of the weighted distance for the attribute is summed with the total quantitative weighted distance. If, at step 444, the direction is not less is better but is same is better, then method 400 continues at a step 450. At step 450, (−1) is multiplied by the absolute value of the weighted distance to the attribute and summed with the total quantitative weighted distance. Equation (10) using Table 2 expresses the calculation of the total quantitative distance.

$$d_{xy} = \sum_{i=1}^{n} w_i sum_i \quad (10)$$

Where $sum_i$ is calculated as follows:

TABLE 2

| Direction of the $i^{th}$ attribute/dimension | $sum_i$ |
|---|---|
| More is better | $y_i - x_i$ |
| Less is better | $x_i - y_i$ |
| Same is better | $-|x_i - y_i|$ |

Figure 4B:
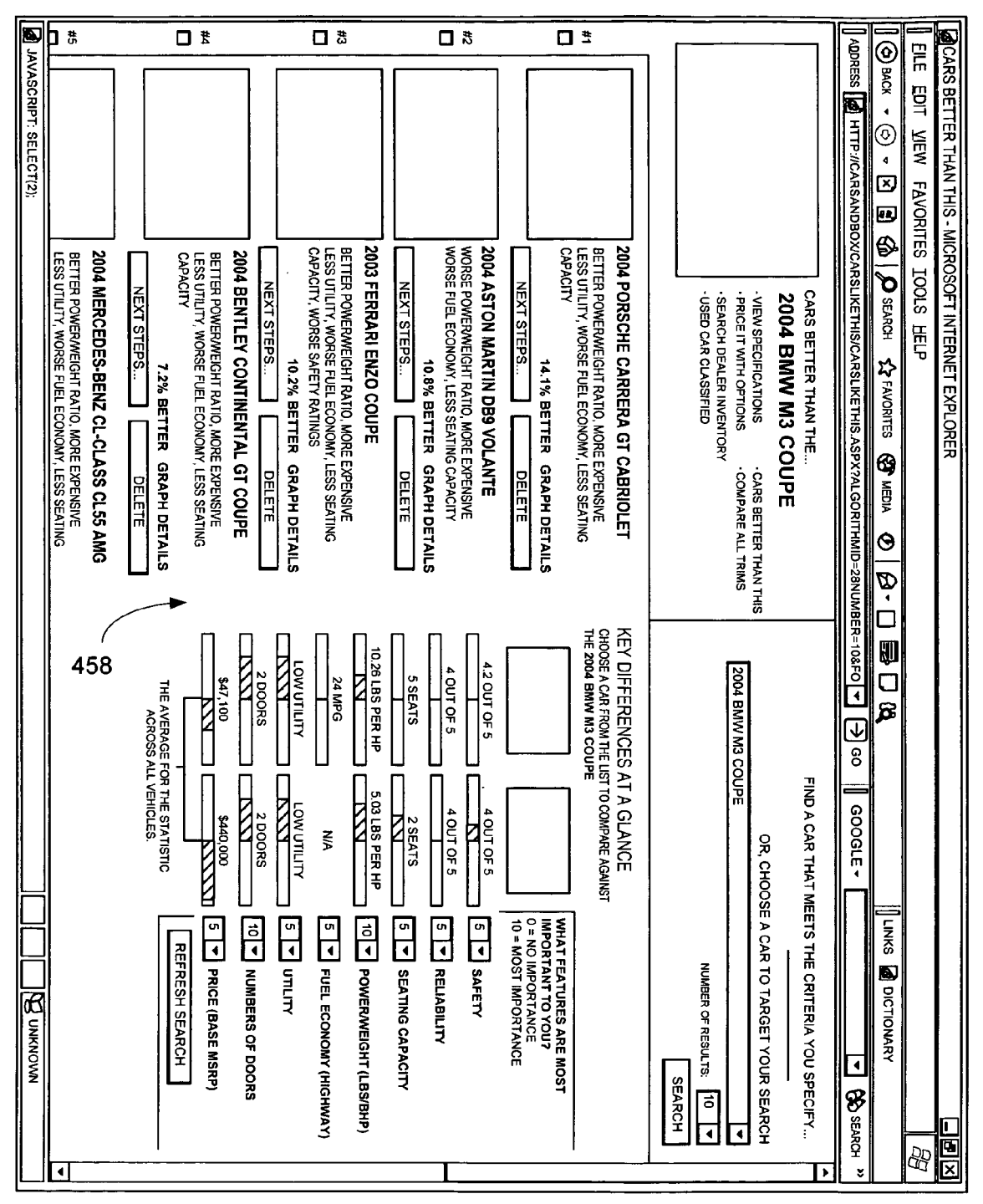

Table 2 defines the value of $sum_i$ for each direction, where $x_i$ represents the z-score for the $i^{th}$ attribute of the focal vehicle, and $y_i$ represents the z-score for $i^{th}$ attribute of the comparison vehicle. At a step 452, equation (10) is divided by $\max|d|$, described above, and a score for the quantitative attributes will be returned with the range of (−1) to (1). Returning to method 400 at step 417, if the attribute is categorical in nature, method 400 continues with a step 426 where the attribute weighting is summed with the total categorical weightings. At a step 420, a determination is made as to whether the attribute is binary. If the attribute is binary in nature, method 400 continues at a step 435, where a determination is made if the value of the comparison vehicle's attribute is the same as the value of the focal vehicle's attribute. If yes, we continue to iterate at a step 416. If not, at a step 436, a determination is made as to whether the direction is true is better. If the direction is true is better, at a step 437, a determination is made if the comparison attribute has a value of true. If the comparison attribute is true, at a step 438, the attribute weighting is added to the total categorical weighted distance. If the comparison attribute is false, at a step 440 the attribute weighting is subtracted from the total categorical weighted distance. Returning to step 436, if the direction is not true is better, but is false is better, then method 400 continues with a step 439 where a determination is made if the comparison attribute has a value of true. If the comparison attribute is true, at a step 440 the attribute weighting is subtracted from the total categorical weighted distance. If the comparison attribute is false, at a step 438 the attribute weighting is added to the total categorical weighted distance. Returning now to step 428 of method 400, if a particular attribute is bitmasked or belongs to a single category, method 400 continues to step 430 where a determination as to direction is made. If the direction is different is better, then at a step 432, the sum of the attribute weighting and total categorical weighted distance is calculated. At step 430 if the direction is not different is better, but is same is better, then at a step 434, the attribute weighting is subtracted from the total categorical weighted distance. After finishing the iterations started at step 415, at a step 454, the categorical score is calculated using equation (8) above. Table 3, shown below, comprises the value of $sum_i$ for the same is better and different is better directions. Table 4, shown below, comprises the value of sums for binary attributes. At a step 456, a score is calculated for each comparison vehicle using equation (9) above. At a step 458, the most relevant results are returned, where the higher the total score for a comparison vehicle the more relevant the comparison vehicle is. FIG. 4B illustrate one embodiment of results 458 that may be displayed to the user (purchaser).

TABLE 3

| Direction | Value of $sum_i$ | |
| --- | --- | --- |
| | If a match | If not a match |
| "same is better" | 0 | −1 |
| "different is better" | 0 | 1 |

TABLE 4

| Direction | Value of $sum_i$ | | | |
| --- | --- | --- | --- | --- |
| | Focal = True Comparison = True | Focal = True Comparison = False | Focal = False Comparison = True | Focal = False Comparison = False |
| "True is better" | 0 | −1 | 1 | 0 |
| "False is better" | 0 | 1 | −1 | 0 |

In another embodiment of the present invention, to build in general attributes (aggregates) such as performance or economy which are weighable and made up of a number of distinct attributes, results for method 300 and 400 are calculated independently for each aggregate (or general attribute). For example, In method 300, the scores for each aggregate are combined into a single score, as is shown in equation (11) below, where $sim_{i\,(xy)}$ is a score for the $i^{th}$ aggregate. Method 400 utilizes a substantially similar equation, except directions may be specified using equation (8) and the values in Tables 2-4.

$$sim_{xy} = \frac{\sum_{i=1}^{n} w_i sim_{i(xy)}}{\sum_{i=1}^{n} w_i} \quad (11)$$

When including aggregates, some additional steps may be modified or added to methods 300 and 400, described above. For instance, user and editorial weightings for the aggregates are retrieved at steps 310 and 410. At steps 311 and 412, The user and editorial weightings are combined into a single weighting for the aggregate. At steps 312 and 414, the aggregate weightings are summed to calculate a total weighting for all aggregates. Further, a score should be calculated for each individual attribute belonging to the aggregate when calculating the aggregate score. Finally, the score for a comparison vehicle in the set of comparison vehicles should be calculated with the aggregate scores calculated for that comparison vehicle. This may be accomplished by multiplying each aggregate score by the aggregate weighting, summing the results together, and dividing all this by the total weighting for all aggregates. The result represents the score for a particular comparison vehicle.

The present invention has been described in relation to particular embodiments, which are intended in all respects to be illustrative rather than restrictive. Other embodiments will become apparent to those skilled in the art that do not depart from its scope. Many embodiments exist, but are not included because of the nature of this invention. A skilled programmer or one skilled in the art may develop other means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need to be carried out in the specific order described. Not all steps of the aforementioned flow diagrams are necessary steps.

What is claimed is:

1. A computer-implemented method of determining a similarity of a set of comparison products to a focal product in a computer system having a processor, display device, and a graphical user interface, the method comprising:

obtaining, by the processor, a user selection of a focal product, the focal product having a plurality of attributes;

obtaining, by the processor, a set of attribute weightings and weighting the plurality of attributes;

obtaining, by the processor, a set of comparison products via a wide-vector analysis, wherein each of the comparison products have a plurality of attributes in common with the focal product;

filling, by the processor, data holes for comparison products missing attributes present in the focal product, wherein the data holes are filled with values that represents the attribute averages for other comparison products having the missing attributes, the other comparison products are in a product family associated with the comparison product missing the attributes;

determining, by the processor, a similarity score for each of the comparison products according to the plurality of attributes in common with the focal product and the attribute weightings, each similarity score representing the distance of similarity of the comparison product to the focal product, wherein the distance of similarity of the comparison product to the focal product is determined by:

comparing each quantitative attribute (y) of the comparison product to each quantitative attribute (x) of the focal product to calculate a total weighted distance between the focal product and the comparison product, wherein the total weighted distance for the comparison product represents a total quantitative score ($d_{xy}$) for the comparison product, $$d_{xy} = \sum_{i=1}^{n} (w_i(x_i - y_i))^2,$$

where n is the number of quantitative attributes and w is the weight, comparing each categorical attribute of the comparison product to each categorical attribute of the focal product to identify matches between the focal product and the comparison product, wherein the weight of each matching categorical attribute is included to calculate a total categorical score for the comparison products, by evaluating $$\text{sum}_j \sum_{i}^{m} = \begin{cases} \text{if } x_j = y_j, \text{ then sum}_j = 1; \\ \text{else} \\ \text{sum}_j = 0 \end{cases}$$

where m is the number of categorical attributes, and determining a total score ($\text{sim}_{xy}$) based upon said total categorical and quantitative scores for each of the one or more comparison products $$\text{sim}_{xy} = \frac{\text{sim}_{c(xy)} \cdot \left(\sum_{i=1}^{n} w_{ci}\right) + \text{sim}_{q(xy)} \cdot \left(\sum_{j=1}^{m} w_{qi}\right)}{\sum_{i=1}^{n} w_{ci} + \left(\sum_{j=1}^{m} w_{qi}\right)} \text{ where } \text{sim}_{cxy} =$$

-continued $$\frac{\sum_{j}^{m} w_j \text{sum}_j}{\sum_{j}^{m} w_j} \text{ and } \text{sim}_{qxy} = 1 - \frac{d_{xy}}{\max|d|}, \max|d|$$

is evaluated using boundary values for each quantitative attribute and said weighting of said plurality of attributes further comprises user-weightings that specify the importance of the attribute to the user and editorial-weightings that are system defaults; and outputting, by the processor, the set of comparison products with the corresponding determined similarity scores for display on the display device, wherein the set of output comparison products are ordered according to the similarity scores.

2. The method of claim 1, wherein said one or more attributes comprise a selection of at least one of the following:
one or more discrete in nature attributes;
one or more continuous in nature attributes;
one or more categorical in nature attributes;
one or more binary in nature attributes;
one or more quantitative in nature attributes;
one or more aggregate in nature attributes; and
combinations thereof.

3. The method of claim 2, wherein said one or more aggregate in nature attributes comprise at least two distinct attributes.

4. The method of claim 1, further comprising standardizing the one or more attributes by:
creating a data store to store the standardized one or more attributes;
for categorical attributes of the one or more attributes, storing categorical attributes representing binary attributes in the data store, converting categorical attributes representing greater than two categories into a bitmask, and storing the bitmask in the data store; and
for quantitative attributes of the one or more attributes, storing a score based on standard deviations for fixed scale quantitative attributes, a score based on median absolute deviations for continuous quantitative attributes, or a score based on average absolute deviation for discrete quantitative attributes in the data store.

5. One or more computer-storage media having computer-useable instructions embodied thereon for performing a method of determining a similarity of a set of comparison products to a focal product in a computer system having a display device rendering a graphical user interface, the method comprising:
obtaining a user selection of a focal product, the focal product having a plurality of attributes;
obtaining a set of attribute weightings and weighting the plurality of attributes;
obtaining a set of comparison products via a wide-vector analysis, wherein each of the comparison products have a plurality of attributes in common with the focal product;
filling data holes for comparison products missing attributes present in the focal product, wherein the data holes are filled with values that represents the attribute averages for other comparison products having the missing attributes, the other comparison products are in a product family associated with the comparison product missing the attributes;

determining a similarity score for each of the comparison products according to the plurality of attributes in common with the focal product and the attribute weightings, each similarity score representing the distance of similarity of the comparison product to the focal product, wherein the distance of similarity of the comparison product to the focal product is determined by:

comparing each quantitative attribute (y) of the comparison product to each quantitative attribute (x) of the focal product to calculate a total weighted distance between the focal product and the comparison product, wherein the total weighted distance for the comparison product represents a total quantitative score ($d_{xy}$) for the comparison product, $$d_{xy} = \sum_{i=1}^{n} (w_i(x_i - y_i))^2,$$

where n is the number of quantitative attributes and w is the weight, comparing each categorical attribute of the comparison product to each categorical attribute of the focal product to identify matches between the focal product and the comparison product, wherein the weight of each matching categorical attribute is included to calculate a total categorical score for the comparison products, by evaluating $$\operatorname*{sum}_{i}^{m}{}_{j} = \begin{cases} \text{if } x_j = y_j, \text{ then } \text{sum}_j = 1; \\ \text{else} \\ \text{sum}_j = 0 \end{cases}$$

where m is the number of categorical attributes, and determining a total score ($sim_{xy}$) based upon said total categorical and quantitative scores for each of the one or more comparison products $$sim_{xy} = \frac{sim_{c(xy)} \cdot \left(\sum_{i=1}^{n} w_{ci}\right) + sim_{q(xy)} \cdot \left(\sum_{j=1}^{m} w_{qi}\right)}{\sum_{i=1}^{n} w_{ci} + \left(\sum_{j=1}^{m} w_{qi}\right)} \text{ where } sim_{cxy} =$$

$$\frac{\sum_{j}^{m} w_j \text{sum}_j}{\sum_{j}^{m} w_j} \text{ and } sim_{qxy} = 1 - \frac{d_{xy}}{\max|d|}, \max|d|$$

is evaluated using boundary values for each quantitative attribute and said weighting of said plurality of attributes further comprises user-weightings that specify the importance of the attribute to the user and editorial-weightings that are system defaults; and outputting the set of comparison products with the corresponding determined similarity scores for display on the display device, wherein the set of output comparison products are ordered according to the similarity scores.

6. The media of claim 5, wherein said one or more attributes comprise a selection of at least one of the following:
one or more discrete in nature attributes;
one or more continuous in nature attributes;
one or more categorical in nature attributes;
one or more binary in nature attributes;
one or more quantitative in nature attributes;
one or more aggregate in nature attributes; and
combinations thereof.

7. The media of claim 6, wherein said one or more aggregate in nature attributes comprise at least two distinct attributes.

8. The media of claim 5, further comprising standardizing the one or more attributes by:
creating a data store to store the standardized one or more attributes;
for categorical attributes of the one or more attributes, storing categorical attributes representing binary attributes in the data store, converting categorical attributes representing greater than two categories into a bitmask, and storing the bitmask in the data store; and
for quantitative attributes of the one or more attributes, storing a score based on standard deviations for fixed scale quantitative attributes, a score based on median absolute deviations for continuous quantitative attributes, or a score based on average absolute deviation for discrete quantitative attributes in the data store.

9. A computer system configured with a processor and one or more computer-readable media having computer-useable instructions embodied thereon for performing a method of determining a similarity of a set of comparison products to a focal product in a computer system having a display device rendering a graphical user interface, the method comprising:
obtaining a user selection of a focal product, the focal product having a plurality of attributes;
obtaining a set of attribute weightings and weighting the plurality of attributes;
obtaining a set of comparison products via a wide-vector analysis, wherein each of the comparison products have a plurality of attributes in common with the focal product;
filling data holes for comparison products missing attributes present in the focal product, wherein the data holes are filled with values that represents the attribute averages for other comparison products having the missing attributes, the other comparison products are in a product family associated with the comparison product missing the attributes;
determining a similarity score for each of the comparison products according to the plurality of attributes in common with the focal product and the attribute weightings, each similarity score representing the distance of similarity of the comparison product to the focal product, wherein the distance of similarity of the comparison product to the focal product is determined by:
comparing each quantitative attribute (y) of the comparison product to each quantitative attribute (x) of the focal product to calculate a total weighted distance between the focal product and the comparison product, wherein the total weighted distance for the comparison product represents a total quantitative score ($d_{xy}$) for the comparison product, $$d_{xy} = \sum_{i=1}^{n} (w_i(x_i - y_i))^2,$$

where n is the number of quantitative attributes and w is the weight, comparing each categorical attribute of the comparison product to each categorical attribute of the focal product to identify matches between the focal product and the comparison product, wherein the weight of each matching categorical attribute is included to calculate a total categorical score for the comparison products, by evaluating $$\operatorname*{sum}_{i}^{m}{}_{j} = \begin{cases} \text{if } x_j = y_j, & \text{then sum}_j = 1; \\ \text{else} \\ \text{sum}_j = 0 \end{cases}$$

where m is the number of categorical attributes, and determining a total score ($sim_{xy}$) based upon said total categorical and quantitative scores for each of the one or more comparison products $$sim_{xy} = \frac{sim_{c(xy)} \cdot \left(\sum_{i=1}^{n} w_{ci}\right) + sim_{q(xy)} \cdot \left(\sum_{j=1}^{m} w_{qi}\right)}{\sum_{i=1}^{n} w_{ci} + \left(\sum_{j=1}^{m} w_{qi}\right)} \text{ where } sim_{cxy} =$$

$$\frac{\sum_{j}^{m} w_j \text{sum}_j}{\sum_{j}^{m} w_j} \text{ and } sim_{qxy} = 1 - \frac{d_{xy}}{\max|d|}, \max|d|$$

is evaluated using boundary values for each quantitative attribute and said weighting of said plurality of attributes further comprises user-weightings that specify the importance of the attribute to the user and editorial-weightings that are system defaults; and outputting the set of comparison products with the corresponding determined similarity scores for display on the display device, wherein the set of output comparison products are ordered according to the similarity scores.

10. The system of claim 9, wherein said one or more attributes comprise a selection of at least one of the following:
one or more discrete in nature attributes;
one or more continuous in nature attributes;
one or more categorical in nature attributes;
one or more binary in nature attributes;
one or more quantitative in nature attributes;
one or more aggregate in nature attributes; and
combinations thereof.

11. The system of claim 10, wherein said one or more aggregate in nature attributes comprise at least two distinct attributes.

12. The system of claim 9, further comprising standardizing the one or more attributes by:
creating a data store to store the standardized one or more attributes;
for categorical attributes of the one or more attributes, storing categorical attributes representing binary attributes in the data store, converting categorical attributes representing greater than two categories into a bitmask, and storing the bitmask in the data store; and
for quantitative attributes of the one or more attributes, storing a score based on standard deviations for fixed scale quantitative attributes, a score based on median absolute deviations for continuous quantitative attributes, or a score based on average absolute deviation for discrete quantitative attributes in the data store.

* * * * *